Patented Mar. 23, 1948

2,438,215

UNITED STATES PATENT OFFICE 2,438,215

TREATMENT OF POLYALKYL AROMATICS

Vladimir N. Ipatieff and Louis Schmerling, Riverside, Ill., assignors to Universal Oil Products Company, Chicago, Ill., a corporation of Delaware No Drawing. Application February 8, 1943, Serial No. 475,180

4 Claims. (Cl. 260—671)

This invention relates particularly to the treatment of polyalkyl aromatics in the presence of non-alkylated aromatics whereby alkyl substituent groups are transferred.

In many instances monoalkyl aromatics are more desirable commercially than corresponding polyalkyl compounds. Outstanding examples of this are toluene, which is the raw material for the manufacture of trinitrotoluene and other derivatives; ethyl benzene, which is readily dehydrogenated to form styrene; and isopropylbenzene or cumene, which has relatively high antiknock value and is utilizable in aviation fuel blends. Since there is a substantial production of polyalkyl benzenes in low temperature coal distillation and in the cracking of both coal tars and heavy petroleum fractions, commercial interests are frequently served when these polyalkyl compounds are converted into monoalkyl derivatives.

It is recognized that various catalysts have been employed previously in effecting the transfer of alkyl groups from polyalkyl aromatics to non-alkylated or less highly alkylated aromatics but in many instances these catalysts produce, in addition to the desired alkyl group transfer, other less desirable side reactions, particularly reactions involving extensive molecular decomposition so that the ultimate yields of monoalkyl aromatics are diminished. In accordance with the present invention particular catalysts and conditions are employed which give improved and generally satisfactory yields of desired monoalkyl aromatics with minimum, or at least reduced, side reactions.

In one specific embodiment the present invention comprises a process for the production of monoalkyl aromatic hydrocarbons which comprises subjecting proportioned mixtures of polyalkyl aromatic hydrocarbons and non-alkylated aromatic hydrocarbons to reaction in the presence of phosphoric acid catalysts.

The catalysts which may be employed to effect the present type of alkyl group transfer reactions are those acids of phosphorous which have three or more replaceable hydrogen atoms such as, for example, orthophosphoric acid ($H_3PO_4$) and pyrophosphoric acid ($H_4P_2O_7$). Acids in this class, either alone or admixed with or supported on relatively inert granular substances of a siliceous, silicate or refractory oxide character have been found to function to varying extents in reactions involving the transfer of alkyl groups from polyalkyl aromatic hydrocarbons to aromatic hydrocarbons of lower degrees of alkyl group substitution.

The solid catalysts useful in the present process are those which are described in United States Patents No. 1,993,512 and No. 1,993,513 and others. The general steps in the manufacture of these catalysts involve the primary compositing of a major proportion of a phosphoric acid such as ortho or pyro phosphoric acid with some finely divided siliceous material such as kieselguhr or a clay until a rather wet paste of uniform consistency is obtained, and heating this paste to drive off water and form a cake which consists essentially of the pyro acid and the siliceous support. The cake is ground up and sized and the sized particles rehydrated by contact with steam if the heating has produced any substantial amount of the meta acid. As an alternative to the manufacture of particles by the grinding and sizing of a cake, the original pasty material may be formed by extrusion or other methods and the steps of drying and rehydrating practiced on the formed particles.

It has been found that catalysts of this type are particularly selective in transferring alkyl groups from polyalkyl aromatics to non-alkylated aromatics to form monoalkyl compounds without experiencing excessive amounts of undesirable decomposition reactions, when proper combinations of temperature, pressure and space velocity in respect to the catalysts are observed. In general it has been found that the ease of transfer of alkyl groups increases with increasing molecular weight of the alkyl groups, up to a certain point after which increasing amounts of decomposition reaction occurs. Thus methyl groups such as those in xylenes and mesitylene are the most difficult to transfer to benzene to produce toluene and require the use of the more severe conditions of temperature, pressure and time of catalytic contact. Ethyl groups are transferred more easily and propyl and butyl groups still more easily. When substituent groups, having 5 or more carbon atoms, are transferred there is an increasing tendency for side reactions to occur and it is necessary to use moderate conditions of temperature and pressure to effect satisfactory disproportionation reactions.

Conditions will also be varied with the types of aromatics which are caused to react in the presence of a catalyst. The present process can be employed effectively to transfer alkyl groups from either mononuclear or polynuclear aromatic hydrocarbons. Thus, for example, methyl, ethyl, propyl and butyl substituent groups may be transferred from polyalkyl benzenes or polyalkyl naphthalenes to either benzenes or naphthalene. When higher molecular weight polynuclear hydrocarbons are employed there may be less selectivity in the alkyl group transfers than when mononuclear alkyl benzenes are reacted with benzene.

The general ranges of temperature which may be employed in the present process are those from about 200° to about 450° C. Pressures of from atmospheric to as high as 200 atmospheres may be used and by suitable manipulation of these factors the phase of the reactants may be varied from strictly vapor phase through mixed phase to substantially liquid phase. The exact combination of temperature and pressure which is most suitable for a given alkyl group transfer reaction is best determined by trial in apparatus of relatively small capacity. The phase will obviously exert an influence on the optimum space velocity which may be defined as the volumes of liquid hydrocarbon reactants per hour passing through the space occupied by the catalyst.

Another factor which requires consideration in the present process is the ratio of polyalkyl aromatics to non-alkylated aromatics which is optimum for producing good yields of monoalkyl compounds. In general as the number of alkyl groups increases in the substituted aromatic, a larger excess of the non-alkylated aromatic will be required if high yields of monoalkyl compounds are to be obtained. In general there should be at least 1 mol of non-alkylated aromatic per side chain in excess of one in the alkylated aromatic from which the group is to be transferred. As will be shown in a later example dealing with the production of ethylbenzene from triethylbenzene and benzene, a 50 percent weight excess of the benzene gave the most desirable results. The weight ratio of non-alkylated aromatic to polyalkyl aromatics may vary over considerable range, say from about 5 to 1.

Another factor which may be used to modify the course of the reactions is the presence of hydrogen or substantially inert gases in the reaction zone. Hydrogen has been found to be particularly effective in reducing the tendency toward undesirable decompositions when relatively high molecular weight compounds are employed as charging materials.

The process may be operated either by batch or continuous procedures. In simple batch operation a mixture of a polyalkyl and a non-alkylated aromatic are placed in a vessel capable of withstanding superatmospheric pressures, a portion of the granular catalyst is added and the vessel is closed and heated for a predetermined time until the transfer of the alkyl groups has taken place to a desired extent. After the reaction is complete the vessel is cooled, residual gas pressure is released and the liquid products are fractionated to effect the separation of unreacted materials and the desired monoalkyl aromatic products. The unreacted compounds may be reproportioned and retreated to increase the ultimate yields of the monoalkyl derivatives.

Continuous operations may be practiced by passing proportioned mixtures of hydrocarbon reactants through reaction chambers containing granular catalysts. In such operations generally higher temperature and shorter times of catalyst contact are usually found to be more suitable than the temperatures and times of contact employed in batch operations. The effluent materials from the reaction zone may be continuously fractionated, the monoalkyl products recovered and the unreacted materials continuously recycled to contact with the granular catalysts.

In the present specification the term "aromatic hydrocarbon" is intended to include both mono and polynuclear compounds either alkylated or non-alkylated and it is further intended to include aromatic compounds substituted by other than alkyl groups such as, for example, amino, hydroxyl, nitro and carboxyl groups. While certain hetero-substituted compounds may not permit the selective transfer of alkyl groups to non-alkylated aromatics as well as the simple alkyl substituted compounds, there are many instances where such transfers can be brought about with a satisfactory degree of selectivity.

The process of the present invention can be employed to advantage in connection with commercial operations for the production of ethyl benzene wherein benzene is continuously alkylated with ethylene by passage of proportioned mixtures of benzene and ethylene in contact with a granular solid phosphoric acid catalyst. In such processes there is a concurrent production of polyethylated benzenes. These latter compounds can be converted into further yields of the more desirable monoethyl benzene in a separate zone or by periodically substituting the polyethyl benzenes for the ethylene, during which period the interchange of ethyl radicals occurs. When the production of the polyethyl benzenes is thus taken care of, the primary operation of alkylating benzene with ethylene can be resumed.

The following data are introduced as illustrative of the operation of the process, although it is not intended that the scope of the invention shall be correspondingly limited.

The catalyst used was made by compositing ortho phosphoric acid with kieselguhr in the approximate weight proportion of 65 parts by weight of the acid and 35 parts by weight of the kieselguhr. The pasty material was heated at a temperature of approximately 450° C., until a solid cake was produced, this cake was ground and sized to produce particles of from about 10 to about 30 mesh, and these particles were contacted with steam at a temperature of about 260° C., and under atmospheric pressure to effect a partial rehydration of a phosphoric acid so that the composition of the acid in the granules was approximately that of pyrophosphoric acid.

The catalyst thus prepared was used to effect an alkyl group transfer reaction between triethylbenzene and benzene. The reactants were placed in a pressure vessel with a minor amount of the catalyst, the pressure was increased by the addition of hydrogen, and the pressure vessel was heated at a temperature of 400° C., for four hours, after which it was cooled, the residual gas pressure released and the liquid hydrocarbons fractionated. The principal data recorded in connection with these runs along with the yields of ethylbenzene, diethylbenzene and triethylbenzene are given in the following table:

| Run number | 1 | | 2 | |
|---|---|---|---|---|
| Reactants, grams: | | | | |
| Triethylbenzene | 50 | | 50 | |
| Benzene | 75 | | 75 | |
| Catalyst | 15 | | 15 | |
| Hydrogen Chloride | 0 | | 2.5 | |
| Pressure, Kilograms per square centimeter: | | | | |
| Initial Hydrogen | 100 | | 100 | |
| Maximum | 260 | | 248 | |
| Final at 23° C | 100 | | 104 | |
| Products, grams: | | | | |
| Catalyst | 19 | | 19 | |
| Noncondensable | | | 1 | |
| Condensed at −78° C | 0 | | 0 | |
| Liquid Product | 116 | | 118 | |
| Loss | 5 | | 2 | |

| Distillation of Liquid Product | Volume Per Cent | $n_d^{28}$ | Volume Per Cent | $n_d^{20}$ |
|---|---|---|---|---|
| Condensed at −78° C | 0 | | 0 | |
| 80–85° C | 55 | 1.5008 | 54 | 1.5003 |
| 85–95 | 0 | | 1.5 | 1.4993 |
| 95–123 | 0 | | | |
| 123–145 | 4 | 1.4949 | 1.5 | 1.4959 |
| 145–175 | 3 | 1.4938 | 5.5 | 1.4943 |
| 175–200 | 5 | 1.4960 | 4.5 | |
| 200–225 | 29 | 1.4994 | 28 | 1.4995 |
| Bottoms | 3 | 1.5225 | 3.5 | 1.5289 |

| Yield: | Grams | Per cent [1] | Grams | Per cent [1] |
|---|---|---|---|---|
| Ethylbenzene | 4.5 | 14 | 2.0 | 6 |
| Diethylbenzene | 9.0 | 22 | 12 | 30 |
| Triethylbenzene | 37 | 74 | 38 | 76 |

[1] Per cent of theoretical based on triethylbenzene charged.

The above data shows that the production of ethyl benzene was effected with a relatively small amount of undesirable decomposition reactions. The ultimate yield of ethyl benzene was increased to 45 percent by recycling of the unconverted triethylbenzene and the diethylbenzene corresponding to a partial de-ethylation of the triethyl compound. In run number 2, where hydrogen chloride was added, the primary yield of ethylbenzene was somewhat lower but the ultimate yield was found to be the same on recycling of the diethyl and triethyl compounds.

We claim as our invention:

1. A process for the manufacture of ethyl benzene which comprises subjecting a proportioned mixture of a polyethyl benzene and benzene to reaction in contact with a phosphoric acid catalyst.

2. A process for the manufacture of ethyl benzene which comprises subjecting a proportioned mixture of a polyethyl benzene and benzene to contact with a solid phosphoric acid catalyst, at a temperature of from about 200° to about 450° C.

3. A process for the manufacture of ethyl benzene which comprises subjecting a proportioned mixture of ethylene and benzene to contact with a solid phosphoric acid catalyst to form ethyl benzene and polyethyl benzenes, separating said ethyl benzene and periodically contacting said polyethyl benzenes in admixture with benzene to contact with said solid phosphoric acid catalyst under reaction conditions.

4. A process for the production of ethyl benzene which comprises subjecting a mixture of benzene and a polyethyl benzene to the action of a solid phosphoric acid catalyst at a reaction temperature of from about 200° C. to about 450° C.

VLADIMIR N. IPATIEFF.
LOUIS SCHMERLING.

REFERENCES CITED

The following references are of record in the file of this patent:

UNITED STATES PATENTS

| Number | Name | Date |
|---|---|---|
| 1,953,702 | Davidson | Apr. 3, 1934 |
| 2,010,948 | Egloff | Aug. 13, 1935 |
| 2,010,949 | Egloff II | Aug. 13, 1935 |
| 2,189,805 | Kyrides | Feb. 13, 1940 |
| 2,238,594 | Malishev | Apr. 15, 1941 |
| 2,257,920 | Sachanen et al. | Oct. 7, 1941 |
| 2,367,535 | Sowa | Jan. 16, 1945 |
| 2,372,320 | Frey | Mar. 27, 1945 |
| 2,373,062 | Stahly | Apr. 3, 1945 |
| 2,382,505 | Schulze | Aug. 14, 1945 |

FOREIGN PATENTS

| Number | Country | Date |
|---|---|---|
| 464,752 | Great Britain | Apr. 19, 1937 |